W. H. DOUGLAS.
POWER TRANSMISSION MECHANISM FOR VEHICLES.
APPLICATION FILED OCT. 16, 1911.
1,167,052.
Patented Jan. 4, 1916.
2 SHEETS—SHEET 2.
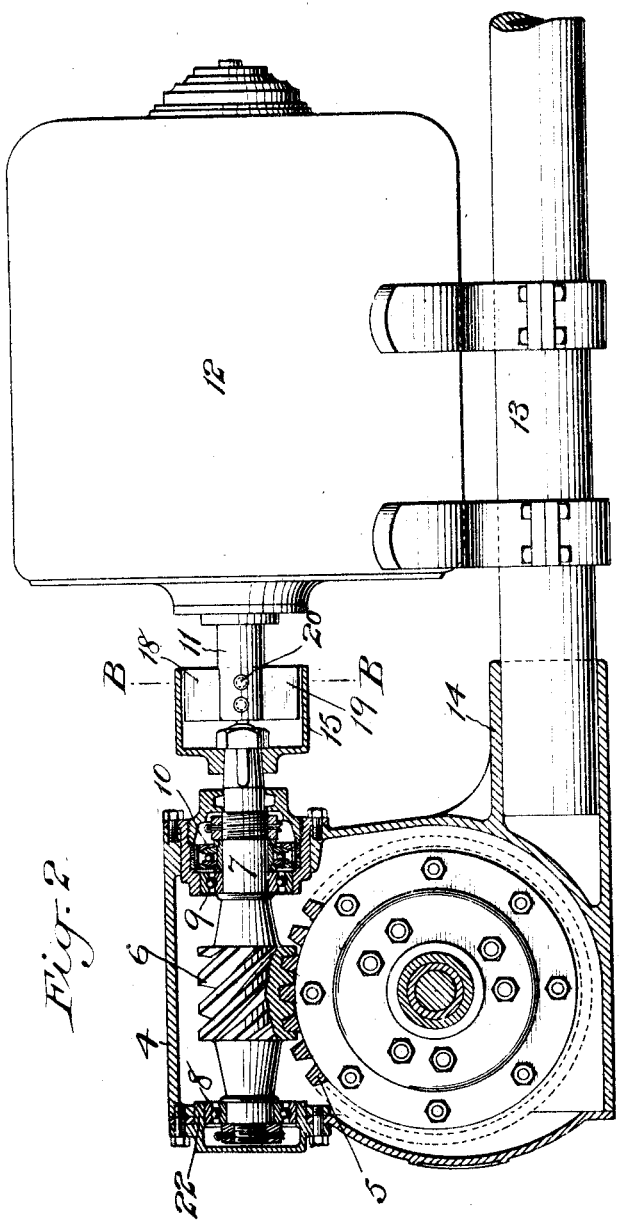
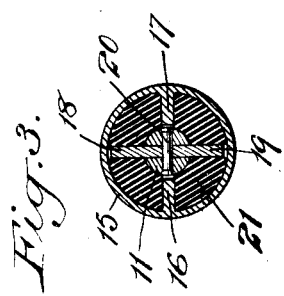
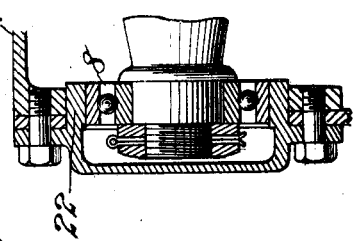
Witnesses:-
F. George Barry
Otto W. Holmgren
Inventor:-
William H. Douglas
by his attorneys

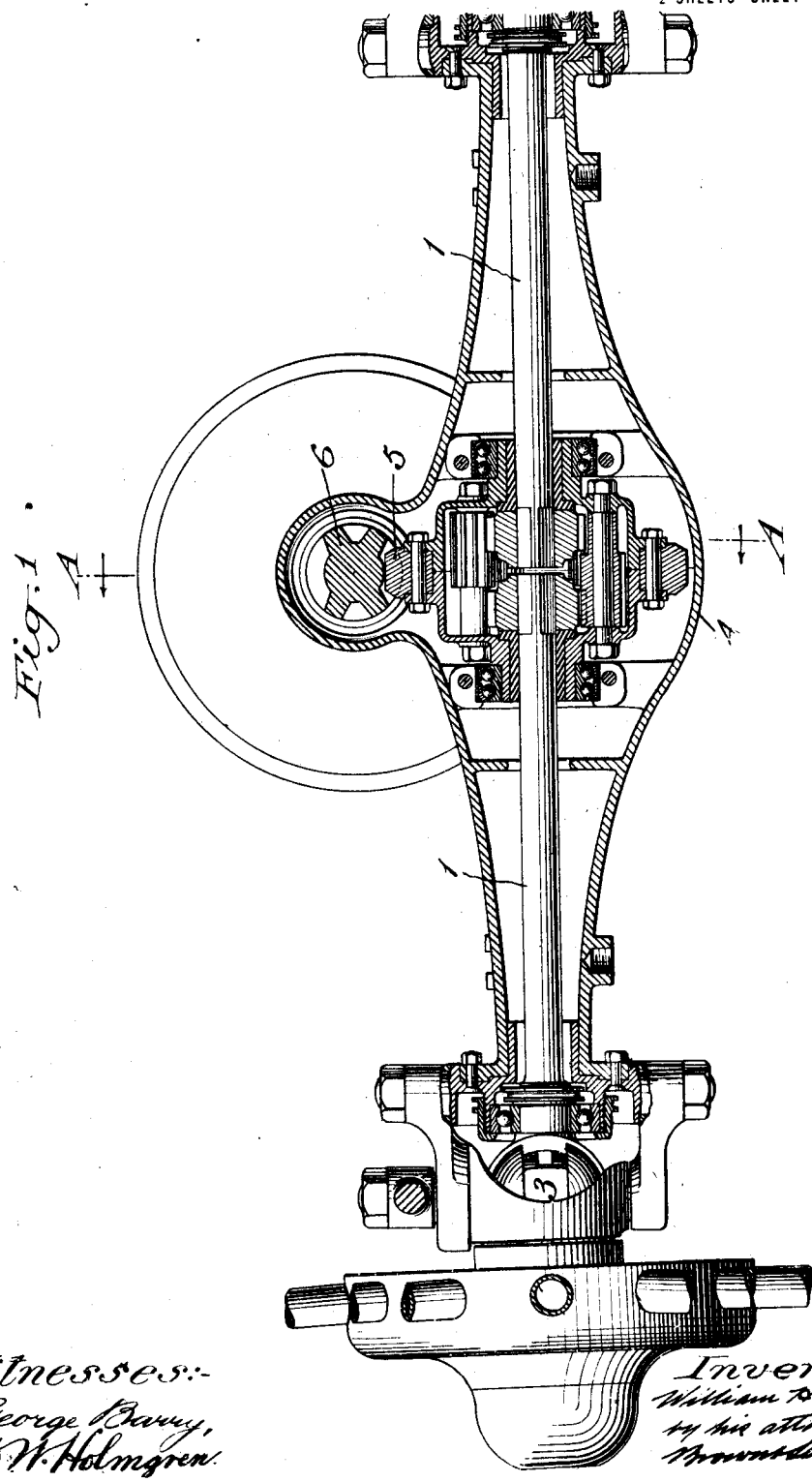

UNITED STATES PATENT OFFICE.

WILLIAM H. DOUGLAS, OF BELLEVILLE, NEW JERSEY, ASSIGNOR TO HEALEY & COMPANY, OF NEW YORK, N. Y., A CORPORATION OF NEW YORK.

POWER-TRANSMISSION MECHANISM FOR VEHICLES.

1,167,052.   Specification of Letters Patent.   Patented Jan. 4, 1916.

Application filed October 16, 1911. Serial No. 654,998.

*To all whom it may concern:*

Be it known that I, WILLIAM H. DOUGLAS, a citizen of the United States, and resident of Belleville, in the county of Essex and State of New Jersey, have invented a new and useful Power-Transmission Mechanism for Vehicles, of which the following is a specification.

This invention relates to power transmission mechanism for vehicles and is particularly directed to novel mechanism for driving the front steering traction wheels of the vehicle.

A practical embodiment of my invention is represented in the accompanying drawings, in which—

Figure 1 is a detail view, partly in front elevation and partly in section, showing the front driving axle of full floating type in connection with one of the front steering traction wheels and the worm driven differential gearing, Fig. 2 is a partial longitudinal vertical section taken in the plane of the line A—A of Fig. 1, the motor and its supporting bar being shown in side elevation, Fig. 3 is a cross section taken in the plane of the line B—B of Fig. 2, showing the yielding driving connection between the alined motor and worm shafts, and Fig. 4 is an enlarged detail section showing the provision for permitting the longitudinal extension and contraction of the worm shaft.

The divided front axle is of the full floating type, the inner shaft members 1 being connected to the outer shaft members 2 by universal joints 3. The front axle housing is denoted by 4. The adjacent ends of the divided axle are connected through a differential gearing of well known or approved construction, said gearing being provided with a worm gear 5 which meshes with a worm 6, the shaft 7 of which is journaled in front and rear anti-friction bearings 8 and 9 and is provided with a thrust bearing 10. This worm shaft 7 is in alinement with the shaft 11 of a motor 12 which is herein shown as an electric motor. These two shafts are always kept in alinement by mounting the motor 12 upon a motor supporting bar 13, the front end of which is rigidly connected to the front axle housing 4 in the present instance by inserting the front end of the bar into a hollow lug 14 projecting rearwardly from the bottom of said housing midway its length. A yielding driving connection between the motor shaft 11 and the worm shaft 7 is provided, which connection is herein shown as constructed and arranged as follows:—The worm shaft 7 has keyed thereto a hollow casing 15 overlapping the motor shaft 11, which casing is provided with inwardly projecting oppositely arranged wings 16, 17. The motor shaft 11 is provided with outwardly projecting oppositely arranged wings 18, 19, disposed at right angles to the wings 16, 17. The wings 18, 19, of the motor shaft are formed by a plate extending diametrically through the end of the shaft, and secured in position by rivets 20. Blocks of rubber or other resilient material 21 are inserted within the casing 15 between the alternating inwardly and outwardly projecting wings of the worm and motor shafts for transmitting the motion from the motor shaft to the worm shaft. This yielding driving connection not only eliminates noise at this point but also reduces the strain on the worm shaft incident to the starting and stopping of the motor and also permits a slight play of the two shafts without affecting the driving connection. The anti-friction bearing for the outer end of the worm shaft 7 is permitted a sliding movement in a cap 22 removably secured to the housing 4, for permitting a slight longitudinal extension and contraction of the shaft 7 without liability of binding of the same. The inner end of each of the inner members of the front divided axle is supported by an anti-friction bearing 52 secured within the front axle housing 4.

It is evident that various changes might be resorted to in the form, construction and arrangement of the several parts without departing from the spirit and scope of my invention; hence I do not wish to limit myself strictly to the structure herein set forth, but

What I claim is:—

1. An axle housing, a differential gearing therein including a power transmission shaft journaled in the housing, a centrally located hollow lug projecting rearwardly from the bottom of said housing, a motor supporting bar inserted in said lug, a motor strapped to and above said bar, a motor shaft in alinement with the power transmission shaft, and a rotatably yielding driving connection between the two shafts.

2. An axle housing, a differential gearing therein including a worm shaft having fixed and thrust antifriction bearings at its rear end and an antifriction bearing at its front end, said front bearing being adapted to slide longitudinally in the housing, a centrally located hollow lug projecting rearwardly from the bottom of said housing, a motor supporting bar inserted in said lug, a motor strapped to and above said bar, a motor shaft in alinement with the worm shaft, and a rotatably yielding driving connection between the two shafts.

In testimony that I claim the foregoing as my invention, I have signed my name in presence of two witnesses, this eleventh day of October, 1911.

WILLIAM H. DOUGLAS.

Witnesses:
F. GEORGE BARRY,
OTTO W. HOLMGREN.